United States Patent
Mehta et al.

(10) Patent No.: US 10,454,832 B2
(45) Date of Patent: Oct. 22, 2019

(54) BALANCING DATA REQUESTS OVER A NETWORK

(71) Applicant: Google Inc., Mountain View, CA (US)

(72) Inventors: Aranyak Mehta, Palo Alto, CA (US); Xi Tan, Mountain View, CA (US); Christopher Harris, Los Altos, CA (US); Samuel Ieong, Mountain View, CA (US); Gabriel Constantin, Alameda, CA (US)

(73) Assignee: Google LLC, Mountain View, CA (US)

( * ) Notice: Subject to any disclaimer, the term of this patent is extended or adjusted under 35 U.S.C. 154(b) by 108 days.

(21) Appl. No.: 15/439,213

(22) Filed: Feb. 22, 2017

(65) Prior Publication Data

US 2018/0219782 A1    Aug. 2, 2018

Related U.S. Application Data

(60) Provisional application No. 62/452,665, filed on Jan. 31, 2017.

(51) Int. Cl.
*H04L 12/803* (2013.01)
*G06F 9/50* (2006.01)
*G06Q 30/02* (2012.01)
*H04L 29/08* (2006.01)

(52) U.S. Cl.
CPC .......... *H04L 47/125* (2013.01); *G06F 9/5083* (2013.01); *G06Q 30/02* (2013.01); *G06Q 30/0241* (2013.01); *H04L 67/02* (2013.01)

(58) Field of Classification Search
CPC ....... H04L 47/125; H04L 47/12; H04L 47/10; G06F 9/5083; G06F 9/50

USPC .......................................... 370/235; 715/744
See application file for complete search history.

(56) References Cited

U.S. PATENT DOCUMENTS

| | | | |
|---|---|---|---|
| 7,962,604 B1 | 6/2011 | Morris et al. | |
| 8,904,277 B2 | 12/2014 | Kroger et al. | |
| 2006/0026067 A1 | 2/2006 | Nicholas et al. | |
| 2006/0080321 A1 | 4/2006 | Horn et al. | |
| 2007/0188623 A1* | 8/2007 | Yamashita | G06T 5/004 348/222.1 |
| 2008/0028064 A1 | 1/2008 | Goyal et al. | |
| 2009/0055273 A1 | 2/2009 | Miyazawa | |
| 2010/0042749 A1* | 2/2010 | Barton | G06F 1/3203 710/1 |

(Continued)

OTHER PUBLICATIONS

Admob Help "Understand Ad Refresh Rate", Google, copyright 2017.

(Continued)

*Primary Examiner* — Kwang B Yao
*Assistant Examiner* — Syed M Bokhari
(74) *Attorney, Agent, or Firm* — Foley & Lardner LLP (57) ABSTRACT

Systems and methods of a balancing data requests over a computer network are provided. The system can receive a request for content to be rendered in a content slot on a computing device. The content slot can be coded with a default timer value. The system can execute a real-time content selection process to identify content items that each have a magnitude. The system can determine a timer value based on the magnitudes, and transmit the timer value to the computing device to override the default timer value to cause the computing device to replace a first content item rendered in the content slot upon expiration of the timer.

20 Claims, 4 Drawing Sheets

(56) References Cited

U.S. PATENT DOCUMENTS

| | | |
|---|---|---|
| 2011/0040635 A1 | 2/2011 | Simmons et al. |
| 2011/0061001 A1* | 3/2011 | Jones .................... G06Q 30/02 |
| | | 715/744 |
| 2014/0229314 A1* | 8/2014 | Datar ....................... G06F 8/38 |
| | | 705/26.3 |
| 2015/0245095 A1* | 8/2015 | Gonzalez ........... H04N 21/4542 |
| | | 725/28 |
| 2015/0339812 A1* | 11/2015 | Oostendorp ............ G06T 7/001 |
| | | 382/141 |
| 2017/0038856 A1* | 2/2017 | Missig .................. G06F 3/0485 |

OTHER PUBLICATIONS

Doubleclick "Refresh Rate for Ads", Google, Copyright 2017.
MoPub "Best Practices for Maximizing Revenue with MoPub" Playbook, 14 pages.
Quora "From a Revenue Standpoint, is There an Optimal Refresh Rate (or a Range of Rates) for Ads Served by Admob?" 2 pages.
Siteadwiki "Top Mobile Display Ads Refresh Rate 15,30, Seconds" 9 pages, Copyright 2014.
International Search Report and the Written Opinion for application No. PCT/US2017/034313 dated Sep. 28, 2017.
Communication pursuant to Article 94 (3) EPC for application 17729607.6-1213 DTD Jun. 11, 2019.

* cited by examiner

FIG. 4

BALANCING DATA REQUESTS OVER A NETWORK

CROSS-REFERENCES TO RELATED APPLICATIONS

This application claims the benefit of priority under 35 U.S.C. § 119 of U.S. Provisional Patent Application No. 62/452,665 filed Jan. 31, 2017, which is incorporated by reference herein in its entirety.

BACKGROUND

Excessive network transmissions, packet-based or otherwise, of network traffic data between computing devices can prevent a computing device from properly processing the network traffic data, completing an operation related to the network traffic data, or timely responding to the network traffic data. The excessive network transmissions of network traffic data can also complicate data routing or degrade the quality of the response if the responding computing device is at or above its processing capacity, which may result in inefficient bandwidth utilization. The control of network transmissions corresponding to content item objects can be complicated by the large number of content item objects that can initiate network transmissions of network traffic data between computing devices.

SUMMARY

At least one aspect is directed to a system to balance data requests over a computer network. The system can include a data processing system. The data processing system can include a timer adjustment component and a content selector component executed by one or more processors. The data processing system can receive one or more data packets comprising a request for content. The content can be rendered in a content slot presented by electronic display hardware via a resource executed by a computing device. The content slot can be coded with a default timer value that, when input into a timer component, causes the content rendered in the content slot to be replaced upon expiration of the timer component. In response to the request, the data processing system can execute a real-time content selection process to identify a plurality of content items. The real-time content selection process can identify the plurality of content items based on the one or more data packets. A first content item of the plurality of content items has a first magnitude, and a second content item of the plurality of content items has a second magnitude. The first content item can be ranked higher than the second content item by the real-time content selection process (e.g., the first magnitude can be greater than the second magnitude). The data processing system can determine a timer value based on a comparison of the first magnitude with the second magnitude. The timer value can be greater than the default timer value. The data processing system can transmit the first content item and the timer value to the computing device to override the default timer value. The timer value can be input into the timer component to cause the computing device to replace the first content item rendered in the content slot upon expiration of the timer component.

At least one aspect is directed to a method of balancing data requests over a computer network. The method can be performed by a data processing system having one or more processors. The method can include the data processing system receiving one or more data packets. The one or more data packets can include a request for content for rendering in a content slot presented by electronic display hardware via a resource executed by a computing device. The content slot can be coded with a default timer value input into a timer component. The timer component can expire after a duration of time set by the timer value. Expiration of the timer component can trigger or cause the replacement of the content rendered in the content slot. The method can include the data processing system performing, responsive to the request, a real-time content selection process to identify a plurality of content items based on the one or more data packets. A first content item of the plurality of content items can have a first magnitude, and a second content item of the plurality of content items can have a second magnitude. The first content item can be ranked higher than the second content item by the real-time content selection process. The method can include the data processing system determining a timer value based on a comparison of the first magnitude with the second magnitude. The timer value can be greater than the default timer value. The method can include the data processing system transmitting the first content item and the timer value to the computing device to override the default timer value. The timer value can be input into the timer component to cause the computing device to replace the first content item rendered in the content slot upon expiration of the timer component.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

Like reference numbers and designations in the various drawings indicate like elements.

DETAILED DESCRIPTION

Following below are more detailed descriptions of various concepts related to, and implementations of, methods, apparatuses, and systems of balancing data requests between computing devices and content selection infrastructure over a network. The various concepts introduced above and discussed in greater detail below may be implemented in any of numerous ways.

The present disclosure is generally directed to adjusting a refresh rate for an image or other digital content presented via electronic display hardware. For example, a data processing system can override a static timer value responsive to determining, in real-time, a greater timer value in order to reduce the number of remote procedure calls, reduce the number of network requests between the computing device coupled to the electronic display hardware and a remote server, reduce battery utilization, memory utilization, and processor utilization.

For example, applications executed on mobile computing devices can include content slots that occupy a portion of the display screen, which may in-turn occupy a portion of the electronic display hardware. The content slot can, for example, have a size of 320×50 pixels and be positioned at a bottom of the display screen without interrupting the main flow of the application. When a content item is rendered in the content slot, the content item can persist on the display screen for a time duration chosen by the application, and then be replaced by another content item in the same content slot. The time duration can be referred to as a refresh rate, counter value, timer value, replacement time, or replacement time interval.

The refresh rate can be a static constant for the content slot configured by the developer of the application. Static refresh rates can include, for example, 60 seconds or 30 seconds. The refresh rate can be the same across computing devices and geographic locations. The refresh rate, once selected, can be coded into the application such that subsequent requests for content are transmitted at the predetermined refresh rate.

Systems and methods of the present disclosure provide a data processing system configured to choose a refresh rate dynamically, with each content item potentially having a different refresh rate for the same content slot. The data processing system can optimize the refresh rate dynamically, with the intended refresh rate increasing or decreasing with a relative magnitude of the current impression. The relative magnitude of the impression can refer to the magnitude of the impression relative to a baseline magnitude.

The data processing system can determine the baseline magnitude using one or more techniques. The data processing system can determine the baseline magnitude using the magnitude associated with a runner-up content item. Thus, the greater the magnitude of the highest ranked content item as compared to the magnitude of the second highest content item is, the greater the time duration the first content item remains on the electronic display hardware before the second content item is requested and rendered for display.

The data processing system can use a relative, instead of an absolute, performance of the first content item to adjust or set the refresh time for the first content item. For example, the data processing system can receive a request for a content item from a computing device. The request can be associated with a content slot on an application executed by the computing device. The content slot can be coded with a refresh time, such as a default or predetermined timer value or default or predetermined refresh time or static refresh time. The data processing system can select a plurality of content items responsive to the request, where each of the selecting plurality of content items has a magnitude value. The data processing system can compare the magnitude of the highest ranked content item of the plurality of content items with a magnitude of the second highest ranked content item of the plurality of content items to determine a refresh time. The determined refresh time can be greater than the default or predetermined refresh time. The data processing system can override the default refresh time of the content slot with the refresh time determined based on the comparison, and then instruct the computing device to either replace the highest ranked content item with the second highest ranked content item based on the refresh time, or generate a second request for a content item after expiration of the refresh time.

Thus, by overriding the static timer value responsive to a real-time comparison of magnitudes of content items selected during a real-time content selection process, the data processing system can reduce the number of remote procedure calls, reduce the number of network requests between the computing device coupled to the electronic display hardware and a remote server, reduce battery utilization, memory utilization, and processor utilization.

Figure 1:
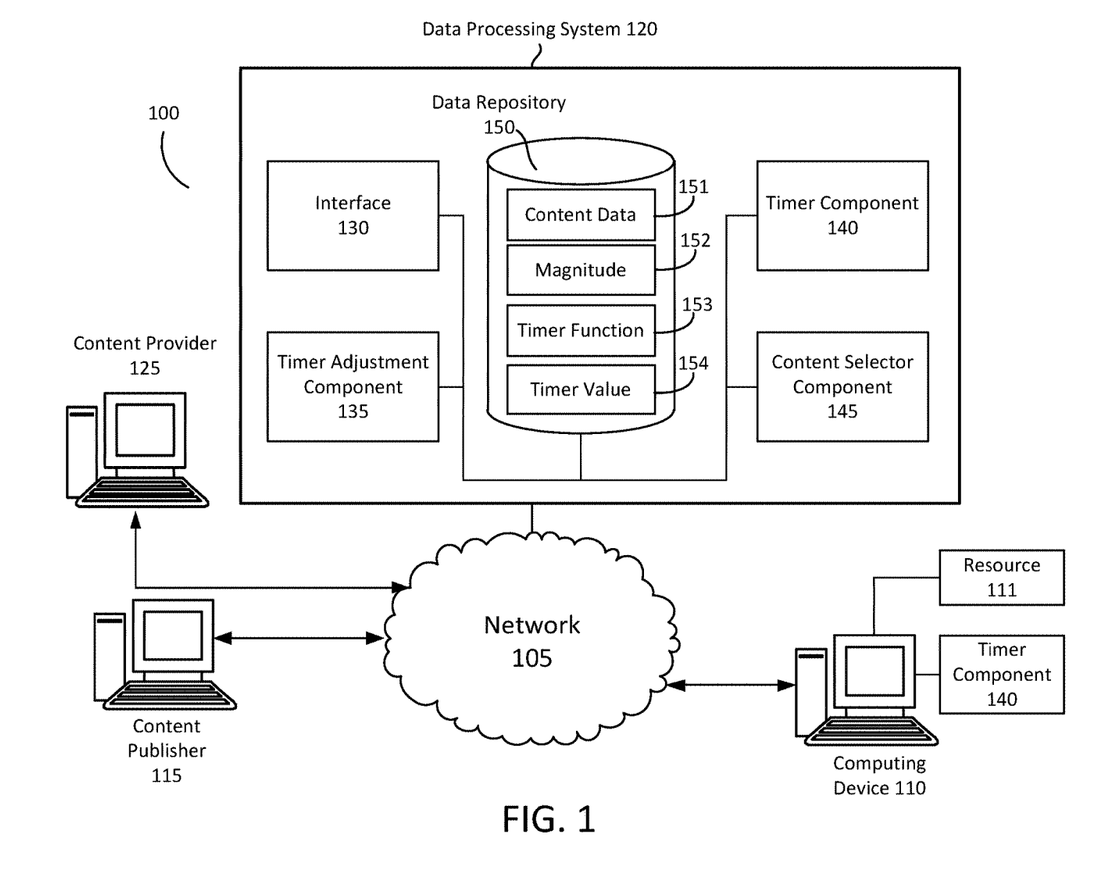
FIG. 1 is an illustration of a system to balance data requests between a computing device and content selection infrastructure over a computer network.

FIG. 1 illustrates an example system 100 to balance data requests between a computing device and content selection infrastructure over a computer network. The system 100 can include content selection infrastructure. The system 100 can include a data processing system 120 communicating with one or more of a content provider computing device 125, content publisher computing device 115 or client computing device 110 via a network 105. The network 105 can include computer networks such as the Internet, local, wide, metro, or other area networks, intranets, satellite networks, and other communication networks such as voice or data mobile telephone networks. The network 105 can be used to access information resources such as web pages, web sites, domain names, or uniform resource locators that can be displayed on at least one computing device 110, such as a laptop, desktop, tablet, personal digital assistant, smart phone, or portable computers. For example, via the network 105 a user of the computing device 110 can access web pages provided by at least one web site operator or content publisher 115. A web browser (e.g., resource 111, application 111 or agent 111) of the computing device 110 can access a web server of the web site operator or content publisher 115 to retrieve a web page for display on a monitor of the computing device 110. The content publisher 115 can provide instructions to the resource 111 executing on the computing device 110 to render the content. The web site operator or content publisher 115 generally includes an entity that operates the web page. The web site operator or content publisher 115 includes at least one web page server that communicates with the network 105 to make the web page available to the computing device 110. The data processing system 120 can provide instructions to the resource 111 executing on the computing device 110 to render content.

The network 105 may be any type or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. The network 105 may include a wireless link, such as an infrared channel or satellite band. The topology of the network 105 may include a bus, star, or ring network topology. The network may include mobile telephone networks using any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS") or universal mobile telecommunications system ("UMTS"). Different types of data may be transmitted via different protocols, or the same types of data may be transmitted via different protocols.

The system 100 can include at least one data processing system 120. The data processing system 120 can include at least one logic device such as a computing device having a processor to communicate via the network 105, for example with the computing device 110, the web site operator or content publisher computing device 115 (or content publisher 115), and at least one content provider computing device 125 (or provider device 125 or content provider 125). The data processing system 120 can include at least one computation resource, server, processor or memory. For example, the data processing system 120 can include a plurality of computation resources or servers located in at least one data center. The data processing system 120 can include multiple, logically-grouped servers and facilitate distributed computing techniques. The logical group of servers may be referred to as a data center, server farm or a machine farm. The servers can also be geographically dispersed. A data center or machine farm may be administered as a single entity, or the machine farm can include a plurality of machine farms. The servers within each machine farm can be heterogeneous—one or more of the servers or machines can operate according to one or more type of operating system platform.

Servers in the machine farm can be stored in high-density rack systems, along with associated storage systems, and located in an enterprise data center. For example, consolidating the servers in this way may improve system manageability, data security, the physical security of the system, and system performance by locating servers and high performance storage systems on localized high performance networks. Centralizing the servers and storage systems and coupling them with advanced system management tools allows more efficient use of server resources.

The data processing system 120 can include a content placement system having at least one computation resource or server. The data processing system 120 can include at least one interface 130, at least one timer adjustment component 135, at least one timer component 140, at least one content selector component 145, and at least one data repository 150. The at least one data repository 150 can include or store, in one or more data structures or data bases, content data 151, magnitude data 152, timer function 153, or timer values 154. Content data 151 can include, for example, content campaign information, content groups, content selection criteria, content item objects or other information provided by a content provider 125 or obtained or determined by the data processing system to facilitate content selection. Magnitude data 152 can include, for example, historical magnitudes associated with content item (e.g., content item objects) stored in content data structure 151. The magnitude data 152 can be categorized or tagged with metadata, such as geographic information, device type information, content selection criteria used to select the content item for display, or features associated with the content item impression. The magnitude can include or refer to a score, value, relevance score, rank, quality value, or status indicator. The magnitude can include a numeric value, alphanumeric value, text, category, string, character or other symbol. The timer function 153 can include one or more functions used by the data processing system 120 to determine a timer value. The timer function 153 can include a script, logic rule, or other technique that receives input values, processes the input value, and output one or more timer values. The timer value data structure 154 can include timer values that can be input into the timer component 140 or used to set the timer component 140. The timer value 154 can include a numeric value, such as a number of seconds (e.g., 10 seconds, 20 seconds, 30 seconds, 40 seconds, 50 seconds, 60 seconds, 70 seconds, 90 seconds, 100 seconds, 120 seconds, 130 seconds, 140 seconds, or more). The timer value can include an indication of a time, such as short duration, medium duration, or long duration.

The interface 130, timer adjustment component 135, timer component 140, and content selector component 145 can each include at least one processing unit or other logic device such as programmable logic array engine, or module configured to communicate with the database repository or database 150. The interface 130, timer adjustment component 135, timer component 140, content selector component 145 and data repository 150 can be separate components, a single component, or part of the data processing system 120. The system 100 and its components, such as a data processing system 120, may include hardware elements, such as one or more processors, logic devices, or circuits.

The data processing system 120 can obtain anonymous computer network activity information associated with a plurality of computing devices 110. A user of a computing device 110 can affirmatively authorize the data processing system 120 to obtain network activity information corresponding to the user's computing device 110. For example, the data processing system 120 can prompt the user of the computing device 110 for consent to obtain one or more types of network activity information. The identity of the user of the computing device 110 can remain anonymous and the computing device 110 may be associated with a unique identifier (e.g., a unique identifier for the user or the computing device provided by the data processing system or a user of the computing device). The data processing system can associate each observation with a corresponding unique identifier.

A content provider 125 may establish an electronic content campaign with one or more parameters, such as keywords or other selection criteria. An electronic content campaign can refer to one or more content groups that correspond to a common theme. A content campaign can include a hierarchical data structure that includes content groups, content item data objects, and content selection criteria. To create a content campaign, content provider 125 can specify values for campaign level parameters of the content campaign. The campaign level parameters can include, for example, a campaign name, a preferred content network for placing content item objects, a budget for the content campaign, start and end dates for the content campaign, a duration for the content campaign, a schedule for content item object placements, language, geographical locations, content selection criteria, keywords, type of computing devices on which to provide content item objects. Other campaign level parameters can include, for example, a payment technique such as a cost-per-click (CPC), cost per thousand impressions (CPM), cost-per-action (CPA), cost-per-conversion, or cost per thousand conversions. The data processing system 120 can determine an outcome of the content item, such as effective cost per mille (eCPM). The eCPM can refer to the outcome of a calculation of a metric generated by a content item or content campaign, divided by the number of impressions of that content item or campaign expressed in units of 1,000. An impression can refer to when a content item object is fetched from its source (e.g., data processing system 120 or content provider 125), and is countable. In some cases, due to the possibility of click fraud, robotic activity can be filtered and excluded, as an impression. Thus, in some cases, an impression can refer to a measurement of responses from a Web server to a page request from a browser 111, which is filtered from robotic activity and error codes, and is recorded at a point as close as possible to opportunity to render the content item object for display on the computing device 110. In some cases, an impression can refer to a viewable impression; e.g., the content item object is at least partially (e.g., 20%, 30%, 30%, 40%, 50%, 60%, 70%, or more) viewable on a display device of the client computing device 110. A click or selection can refer to a user interaction with the content item object, such as a mouse-click, touch interaction, gesture, shake, audio interaction, or keyboard click. A conversion can refer to a user taking a desired action with respect to the content item objection; e.g., purchasing a product or service, completing a survey, visiting a physical store corresponding to the content item, or completing an electronic transaction.

The content provider 125 can further establish one or more content groups for a content campaign. A content group includes one or more content item objects and corresponding content selection criteria, such as keywords, words, terms, phrases, geographic locations, type of computing device, time of day, interest, topic, or vertical. Content groups under the same content campaign can share the same campaign level parameters, but may have tailored specifications for particular content group level parameters, such as keywords, negative keywords (e.g., that block placement of the content item in the presence of the negative keyword on main content), bids for keywords, or budget.

To create a new content group, the content provider 125 can provide (e.g., via interface 130) values for the content group level parameters of the content group. The content group level parameters include, for example, a content group name or content group theme, and bids for different content placement opportunities (e.g., automatic placement or managed placement) or outcomes (e.g., clicks, impressions, or conversions). A content group name or content group theme can be one or more terms that the content provider 125 can use to capture a topic or subject matter for which content item objects of the content group is to be selected for display. For example, a car dealership can create a different content group for each brand of vehicle it carries, and may further create a different content group for each model of vehicle it carries. Examples of the content group themes that the car dealership can use include, for example, "Make A sports car" "Make B sports car," "Make C sedan," "Make C truck," "Make C hybrid," or "Make D hybrid." An example content campaign theme can be "hybrid" and include content groups for both "Make C hybrid" and "Make D hybrid", for example.

The content provider 125 can provide (e.g., via interface) one or more keywords and content item objects to each content group. Keywords can include terms that are relevant to the product or services of associated with or identified by the content item objects. A keyword can include one or more terms or phrases. For example, the car dealership may include "sports car," "V-6 engine," "four-wheel drive," "fuel efficiency," as keywords for a content group or content campaign. In some cases, negative keywords can be specified by the content provider to avoid, prevent, block, or disable content placement on certain search result webpages or content webpages matching those negative keywords. The content provider can specify a type of matching, such as exact match, phrase match, or broad match, used to select content item objects.

The data processing system 120 can include, execute, or communicate with an interface 130. The interface 130 can include, for example, a graphical user interface with one or more input text boxes, buttons, drop down menus, widgets or other user interface elements. The data processing system 120 can provide the graphical user interface for rendering on a content provider device 125. The data processing system 120 can receive, via the interface 130, parameters or other information that facilitates a content selection process or establishing a content selection process.

The interface 130 can include a dynamic interface. The dynamic interface can provide information responsive to input received from the content provider device 125. The interface 130 can forward or route data packets received from the content provider device 125 to one or more component of the data processing system 120, such as the content selector component 145 or data repository 150. The interface 130 can include a network interface, user interface, input/output interface, communications port, a bus, or other software or hardware to provide data packets or information to a content provider device 125, content publisher device 115 or computing device 110, and receive data packets or information from the content provider device 125, content publisher device 115 or computing device 110.

The content provider 125 can provide one or more content item objects for selection by the data processing system 120. The data processing system 120 can select the content item objects when a content placement opportunity becomes available that matches the budget, content schedule, maximum bids, keywords, and other selection criteria specified for the content group. Different types of content item objects can be included in a content group, such as a text content item, an image content item, video content item, audio content item, multimedia content item, call content item, or content item link.

The data processing system 120 can include, execute, or otherwise communicate with a content selector component 145 to receive and select, based on the keyword, a content item via a real-time content selection process. The content selection process can refer to, or include, selecting sponsored content item objects provided by third party content providers 125. The real-time content selection process can include a service in which content items provided by multiple content providers are parsed, processed, weighted, or matched in order to select one or more content items to provide to the computing device 110. The content selector component 145 can perform the content selection process in real-time. Performing the content selection process in real-time can refer to performing the content selection process responsive to the request for content received via the client computing device 110. The real-time content selection process can be performed (e.g., initiated or completed) within a time interval of receiving the request (e.g., 5 seconds, 10 seconds, 20 seconds, 30 seconds, 1 minute, 2 minutes, 3 minutes, 5 minutes, 10 minutes, or 20 minutes). The real-time content selection process can be performed during a communication session with the client computing device 110, or within a time interval after the communication session is terminated.

For example, the data processing system 120 can include a content selector component 145 designed, constructed, configured or operational to select content item objects. To select content items for display, the data processing system 120 can use keywords to select a matching content item based on a broad match, exact match, or phrase match. For example, the content selector component 145 can analyze, parse, or otherwise process subject matter of candidate content items to determine whether the subject matter of the candidate content items correspond to the subject matter of the keywords or phrases associated with the request for content from the computing device 110 (e.g., keywords associated with main content of a web page or a search query input into a search engine). The content selector component 145 can identify, analyze, or recognize terms, characters, text, symbols, or images of the candidate content items using an image processing technique, character recognition technique, or database lookup. The candidate content items may include metadata indicative of the subject matter of the candidate content items, in which case the content selector component 145 may process the metadata to determine whether the subject matter of the candidate content item corresponds to the input keywords.

For example, the data processing system 120 can receive, from computing device 110, one or more data packets comprising a request for content to be rendered in a content slot. The content slot can be presented by electronic display hardware via the resource 111 executed by the computing device 110. The resource 111 can include, e.g., a web browser, mobile application, or video game. Responsive to receiving the request, the data processing system 120 (e.g., via content selector component 145) can execute a real-time content selection process to identify a plurality of content items based on the one or more data packets. The content selector component 145 can identify the plurality of content items based on matching one or more criteria carried or indicated by the one or more data packets with one or more content selection criteria provided by the content provider 125. The criteria indicated by the one or more data packets can include information about the content slot on which the content item is to be rendered, information associated with resource 111, information about the web page, or information associated with the computing device 110.

The data processing system 120 can identify relevant content items based on a relevance score between characteristics of the content item, selection criteria provided by the content provider 125, and information associated with the request or content slot. The relevance score can include a magnitude. The data processing system 120 can determine a magnitude for each content item. Then data processing system 120 can rank the content items based on the magnitude. For example, a higher magnitude value for a content item can indicate that the content item is more relevant to the request as compared to a content item with a lower magnitude value. The magnitude values can be normalized to a range or scale, such as 0 to 1, 0 to 10, or 0 to 100. For example, the data processing system 120 (e.g., via the real-time content selection process) can identify a first content item with a magnitude (or relevance score or ad score or content score) of 0.9, and identify a second content item with a magnitude of 0.7. Thus, the first content item can be ranked higher than the second content item by the real-time content selection process because the first content item has a greater magnitude score than the second content item. The data processing system 120 can provide the first content item, or highest ranked content item, to the computing device 110 to cause the computing device 110 to render the highest ranked content item in the content slot provided via the resource 111 executed by the computing device 110.

The highest ranked content item can be refreshed or replaced with another content item. For example, the content slot (or resource 111) can be coded with a default timer value. For example, the developer of the video game or other mobile application can configure the content slot with a default timer value. The developer of the resource 111 can establish a configuration file with static, default timer values. The timer value can be referred to as static because it can be predetermined. The timer value can be referred to as predetermined when the timer value is set or determined at a point in time prior to transmission of the request for content or prior to the data processing system 120 receiving the request for content, or prior to the data processing system 120 performing a content selection process. The timer value can be referred to as static if the timer value stays the same for each content item that is rendered in the content slot. The timer value can be referred to as static if there is no mechanism to change the timer value responsive to the content item request or to the content item that is selected for rendering in the content slot. The timer value can be referred to as static if it is not determine dynamically based on a magnitude associated with the content item or one or more content items.

The timer value can be used to set a duration for the content item impression, after which the content slot can be refreshed with a new content item. For example, a second content item can replace a first content item after a time interval set by the timer value. The timer value can be input into a timer component 140. The timer component 140 can include, for example, a countdown timer starting at the timer value, or a counter that terminates or expires at the timer value. Thus, the timer value can be input into the timer component 140 to replace the content rendered in the content slot upon expiration of the timer component 140.

However, excessive or wasteful requests for content from content selection infrastructure can be inefficient and consume computing resources, such as processor utilization, memory usage, or network bandwidth. Further, excessive or wasteful requests to replace content can consume battery energy on a mobile device, as well as other computing resources on the mobile device. Replacing content items on a web page can also result in a diminished user interface or user experience. For example, an end user may be interested in the content item, but the data processing system 120 may replace the content item prior to the end user being able to interact with the content item, causing the end user to initiate additional data request or web searches to fetch the desired content.

Thus, systems and methods of the present solution provide a data processing system 120 that can override a static timer value that triggers a content item replacement process responsive to determining, in real-time, a greater timer value in order to reduce the number of remote procedure calls, reduce the number of network requests between the computing device coupled to the electronic display hardware and a remote server, reduce battery utilization, memory utilization, and processor utilization.

The data processing system 120 of the present solution can include a timer adjustment component 135. The data processing system 120 can include, access, execute, interface with or otherwise utilize or communicate with the timer adjustment component 135. The timer adjustment component 135 can determine a timer value based on a comparison of magnitudes of content items identified via the real-time content selection process. The timer adjustment component 135 can, for example, compare the magnitude of a highest ranking content item of the plurality of content items identified via the content selection process with the magnitude of a second highest ranking content item.

The timer adjustment component 135 can determine the timer value based on two or more magnitudes of two or more corresponding content items. For example, the timer adjustment component 135 can input two or more magnitudes corresponding to two or more content items into a function that manipulates, combines, or otherwise processes the magnitudes to generate a timer value.

The data processing system 120 can determine the timer value based on the magnitude of the highest ranking candidate content item and a baseline magnitude. The data processing system 120 can determine the baseline magnitude based on historical magnitude values. The data processing system 120 can retrieve the baseline value from magnitude data structure 152 stored in data repository 150. The data processing system 120 can retrieve historical magnitude values stored in magnitude data structure 152 in data repository 150 and determine a baseline magnitude based on the retrieved historical magnitude values. The data processing system 120 can determine the timer value based on the first magnitude and the baseline magnitude.

The timer adjustment component 135 can determine the timer value based on a magnitude of the first content item and historical magnitude values of one or more content items. The historical magnitude values can correspond to a magnitude of the content item when it was previously selected for display on the computing device or another computing device having one or more characteristic similar with the present computing device (e.g., geographic location or type of computing device). The historical magnitude values can correspond to a magnitude of the content item when it was previously selected for display in the content slot or another content slot having one or more characteristic similar with the present content slot (e.g., geographic location, size of content slot, position of content slot, or metadata associated with the content slot).

The data processing system 120 can determine the timer value (or refresh time or refresh rate) for the highest ranked content item based on the magnitude using a Poisson Model of attention. For example, the timer value can be based on a logarithmic function of the magnitude of the highest ranked content item and a baseline magnitude. The baseline magnitude can be a historical average magnitude, historical median magnitude, historical low magnitude, historical magnitude corresponding to a standard deviation, or a magnitude of another content item that was identified as a candidate for display in the content slot. For example, the baseline magnitude can correspond to the magnitude of the second highest ranked content, third highest ranked content item, fourth highest ranked content item, or an average one or more of the second ranked content item, third ranked content item, or fourth ranked content item.

The data processing system 120 can determine the timer value based on a logarithm of a ratio of the second magnitude and the first magnitude. For example, the time interval can be determined using the following function:

time_interval=−lambda*ln(magnitude_ratio), where magnitude_ratio=magnitude_second_content_item/magnitude_first_content_item, and lambda is a constant, such as 1 second, 2 seconds, 3 seconds, 4 seconds, 5 seconds, 6 seconds, or more. The data processing system can employ data mining techniques to tune lambda.

The data processing system 120 can identify the timer value by mapping magnitude associated with one or more content items to a range. The data processing system 120 can map a ratio of the second magnitude and the first magnitude to the timer value in a range of timer values. The range of timer values comprising a minimum timer value and a maximum timer value. The range of timer values can increment by a value from the minimum to the maximum. The increment value can include, for example, 0.5 second, 1 second, 2 seconds, 3 seconds, 4 seconds, 5 seconds or some other increment value.

The data processing system 120 can map the timer value based on a monotonically increasing tuning function. The data processing system 120 can map a ratio of the second magnitude and the first magnitude to the timer value using the tuning function. For example, the data processing system can map the magnitude ratio to a range of refresh times (e.g., 30 to 150 seconds) as follows:

refresh_time_first_content_item=min_time+f(magnitude_ratio)*(max_time−min_time), where f( ): [0,1]→[0,1] can be a monotonically increasing tuning function. A monotonic function (or monotone function) can refer to a function between ordered sets that preserve or reverse the given order.

The data processing system can use a historical average (e.g., by country or application) of the magnitude of the first content item or highest ranked content item as a baseline magnitude. With this approach, the better the content item is when compared to what was expected in a given country or application, the longer the content item will remain on the screen. For example:

time interval=min_time+g(first_content_item_magnitude/historical_magnitude)*(Max_time−Min time), where g(x) is a monotonically increasing tuning function in x such that 0<=g(x)<=1 for all x>0.

The timer adjustment component 135 can determine the timer value using one or more technique such that the timer value is different than the default timer value, static timer value or other predetermined timer value either coded into the content slot, provided by the content provider 125 or content publisher 115, or other established prior to the content selection process by the data processing system 120. The timer value can be determined in real-time (e.g., after receiving the request for content, after the content selection process, during the content selection process, or after identifying candidate content items, or within a time interval of receiving the request for content (e.g., 0.5 seconds, 1 second, 2 seconds, 3 seconds, 4 seconds, 5 seconds, 10 seconds, or more). The timer value determined in real-time can be greater than or less than the default timer value. The data processing system 120 can determine to override the default or static timer value with the timer value determined by the data processing system 120 based, at least in part, on the magnitude of the highest ranking content item.

The data processing system 120 can provide the determined timer value to the computing device 110 along with the first content item to cause the computing device to render the first content item in the content slot for a duration corresponding to the determined timer value. The timer value can be input into a timer component 140. The timer component 140 can include a counter, timer, stop watch, countdown timer, count up timer, hardware timer, software timer, clock, alarm clock or other component configured to measure elapsed time and provide an indication responsive to expiration of a time interval.

The timer component 140 can be located or executed by the data processing system 120. For example, the timer component 140 can be locally executed on the computing device 110, such as by resource 111 or other application executing on computing device 110. The timer component 140 can include a hardware timer component configured on computing device 110.

The timer component 140 can be located or executed by the data processing system 120 or the computing device 110. For example, the timer component 140 can be locally executed on the computing device 110, such as by resource 111 or other application executing on computing device 110. The timer component 140 can include a hardware timer component configured on computing device 110.

The data processing system 120 can transmit the first content item and the timer value to the computing device 110 to override the default timer value of the content slot. The computing device 110 can input the timer value input into the timer component 140 to cause the computing device 110 to replace the first content item rendered in the content slot upon expiration of the timer component 140. For example, the computing device 110 can set the timer component 140 to expire based on the timer value (e.g., 40 seconds). Responsive to expiration of the timer component 140, the computing device 110 can cause the content item rendered in the content slot to be replaced.

The data processing system 120 can compare the timer value with the default timer value and determine to override the default value with the timer value based on the comparison. The local computing device 110 can compare the timer value with the default timer value and determine to override the default value with the timer value based on the comparison. For example, the data processing system 120 can provide or transmit the timer value to the computing device 110, and the computing device 110 can perform the comparison and determine to override, replace, or otherwise use the new timer value instead of the default timer value.

The data processing system 120 (or computing device 110) can combine the new timer value with the default timer value. For example, the refresh time for the content item can be the average of the new timer value and the default timer value.

Responsive to expiration of the timer component 140, the first content item can be replaced. The replacement can include a second content request, executing a second real-time content selection process, or replacing the first content item with a second content item retrieved from memory (e.g., stored on the computing device 110 or in memory on the data processing system 120).

For example, responsive to expiration of the timer component 140, the data processing system 120 can transmit a second content item to the computing device 110 to cause the computing device to replace the first content item rendered in the content slot with the second content item. The second content item can refer to the second highest ranking content item identified by the data processing system 120 during the first real-time content selection process that identified the first content item. For example, the data processing system 120 can identify, responsive to the first request for content, the first content item and the second content item and determine to transmit the first content item along with the first timer value to the computing device 110. The data processing system 120 can further store the second content item in memory and wait for the timer to expire before transmitting the second content item. By storing the second item in memory and waiting for the timer to expire before sending the second content item, the data processing system 120 can reduce resource utilization by performing a single real-time content selection process for two content item impressions. By waiting to transmit the second content item until the timer expires, the data processing system 120 can reduce resource utilization on the computing device 110 as the computing device 110 may not store additional content items in memory or may not receive content items that may not be rendered in the event the end user navigates away from the content slot before the timer expires. Allocating a larger amount of time in the session to the first content item as compared to the second content item can result in an improved outcome in the session as the first content item can be more desirable and trigger network activity (e.g., a selection, electronic transaction, or request for additional content). The data processing system 120 can allocate a larger amount of time in the session to the first content item because the first content item can be a higher quality content item as compared to the second content item.

The data processing system 120 can transmit the first content item and the second content item to the computing device responsive to the request for content. For example, the data processing system 120 can transmit both the first content item and the second content item at the same time or during the same data transmission comprising one or more data packets. The data processing system 120 can transmit multiple content items prior to expiration of the timer component. The computing device 110 can store, in memory, the one or more content items prior to replacement of the first content item. The data processing system 120 can instruct the computing device to render the first content item in the content slot and store the second content item in memory. The data processing system 120 can instruct the computing device to retrieve the second content item from memory upon expiration of the timer component, and replace the first content item rendered in the content slot with the second content item upon expiration of the timer component.

The data processing system 120 can transmit the instructions along with the data transmission including the first content item and the second content item. The data processing system 120 can transmit the instructions using one or more data transmissions. For example, the data processing system 120 can transmit a first instruction along with the first content item, and a second instruction to cause the replacement upon expiration of the timer component 140. The data processing system 120 can transmit the second instruction responsive to expiration of the timer component 140 (e.g., the timer component 140 can be executed on the data processing system 120). The data processing system 120 can transmit the second instruction prior to expiration of the timer component 140, and the second instruction can include an instruction to replace the first content item with the second content item responsive to expiration of the timer component 140 executed on the computing device 110.

Responsive to expiration of the timer component 140, the data processing system 120 can receive a second request for content to replace the first content item rendered in the content slot. The second request for content can be transmitted by the computing device 110 responsive to expiration of the timer component 140 executed on the computing device 110. The data processing system 120 can execute, responsive to the second request, a second real-time content selection process. The second real-time content selection process can identify a second plurality of content items. The second plurality of content items, or second plurality of candidate content items, can include a third content item and a fourth content item. Each content item can have a magnitude value. For example, the third content item can have a third magnitude and the fourth content item can have a fourth magnitude. The third content item can have a greater magnitude than the fourth content item and, therefore, be ranked higher than the fourth content item.

The data processing system 120 can determine a timer value (or refresh time or refresh rate) for the third content item. Rather than re-use the timer value determined for the first content item, or use the default timer value, the data processing system 120 can determine a second timer value for the third content item. The data processing system 120 can determine the second timer value using one or more function or technique used to determine the timer value for the first content item. For example, the data processing system 120 can determine the second timer value based on a comparison of the third magnitude with a baseline magnitude or with the fourth magnitude. The second timer value can be different from the default timer value and the timer value. The data processing system 120 can transmit the third content item and the second timer value to the computing device to override the timer value or the default timer value. The second timer value can be input into the timer component 140 to cause the computing device to replace the third content item rendered in the content slot upon expiration of the timer component.

The data processing system 120 can determine that the second timer value, based on a comparison of the third magnitude with the fourth magnitude, is less than the default timer value. The data processing system 120 can determine to replace the default timer value with the second timer value. The data processing system 120 can determine not to override the default value with the second timer value based on the second timer value being less than the default timer value. For example, the data processing system 120 can determine not to override the default value with the second timer value because the second timer value would result in a short refresh time, which may result in increased resource utilization as compared to the default timer value.

The data processing system 120 can push the second content item to the computing device 110 to replace the first content item without the data processing system 120 receiving a request to replace the content item. For example, the data processing system 120 can determine the timer value but not transmit the timer value to the client computing device 110. Instead, the data processing system 120 can execute a timer or counter on the data processing system 120 for the timer value. Responsive to expiration of the timer on the data processing system 120, the data processing system 120 can push the second content item to the client computing device 110 to cause the client computing device 110 to replace the first content item with the second content item in accordance with the determined timer value and refresh rate. Thus, the data processing system 120 can cause the client computing device 110 to replace the first content item without the data processing system 120 transmitting the timer value. The data processing system 120 can override a predetermined or default timer value set for the content slot presented via the client computing device 110 by pushing the second content item to the client computing device 110 responsive to the determined timer value.

Figure 2:
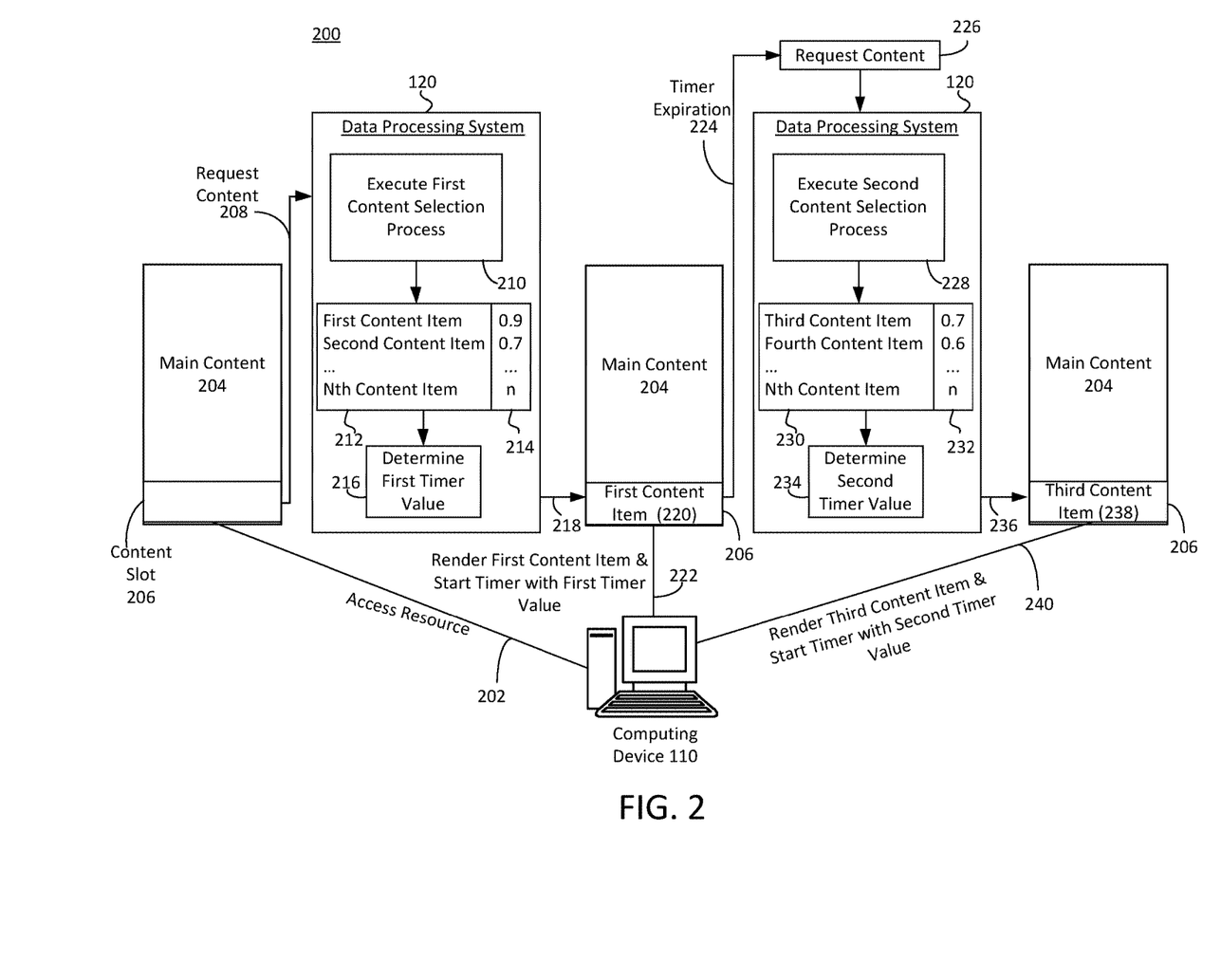
FIG. 2 is an operational block diagram of a system to balance data requests between a computing device and content selection infrastructure over a computer network.

FIG. 2 is an operational block diagram of a system 200 to balance data requests between a computing device and content selection infrastructure over a computer network. The system 200 can include one or more component or functionality of system 100 or system 400, including, for example, data processing system 120 and computing device 110. As illustrated in FIG. 2, the computing device 110 can access a resource (e.g., resource 111 or other online resource) at ACT 202. Accessing the resource can launching a web browser, launching an application, interacting with a web browser, requesting content via a network, or otherwise interacting with an application or consuming content. The computing device 110 can access a mobile application that includes a graphical user interface that presents main content 204 and includes a content slot 206. The main content 204 and the content slot 206 can be provided or presented via electronic display hardware, such as a display screen or monitor of the computing device 110.

The main content 204 can include or refer to the main content of the mobile application, such as a video game, video, image, article, electronic book, or other content. The main content 204 can include electronic or online document, such as a web page containing an article or blog post. A content slot 206 can be presented alongside the main content 204. The content slot can be configured by a content provider (e.g., content provider 125) or content publisher (e.g., content publisher 15). The content slot 206 can be positioned on the graphical user interface. For example, the content slot 206 can be positioned at a top, bottom, left side, or right side of the electronic display hardware.

The content slot 206 can be populated with a content item. The data processing system 120 can receive a request for content at ACT 208. The data processing system 120 can receive the request for content from the computing device 110, a content publisher device 115, or another device. The data processing system 120 (e.g., via content selector component 145) can execute a first content selection process at ACT 210. The first content selection process can identify multiple candidate content items 212 that each have a corresponding magnitude 214. For example, the first content item can have a magnitude of 0.9; the second content item can have a magnitude of 0.7; and an Nth content item can have a magnitude of n.

The magnitude values 214 can be used by the data processing system 120 to determine the first timer value at ACT 216. For example, the timer adjustment component 135 of the data processing system 120 can receive the magnitude values 214. The timer adjustment component 135 can receive one or more magnitude values 214. The timer adjustment component 135 can receive a first magnitude value for the first content item, and then identify, retrieve or determine a baseline magnitude value. The timer adjustment component 135 can receive the first magnitude value 0.9 and the second magnitude value 0.7 corresponding to the first and second content items. The data processing system 120 can determine the first timer value using one or more component or function of the data processing system 120.

The data processing system 120 can provide the first content item (e.g., the highest ranking content item based on the magnitude values) for rendering in the content slot 206 at ACT 218. The first content item 220 can be rendered in content slot 206 alongside the main content 204. The first content item 220 can be rendered in the content slot and presented via electronic display hardware of the computing device 110 at ACT 222. Further, a timer component can be configured with the first timer value and the timer component can start measuring the elapsed time. The timer component (e.g., timer component 140) can initiate responsive to the first content item 220 being rendered in the content slot 206 or otherwise presented for display via computing device 110.

At ACT 224, the timer can expire and trigger a second request for content 226. The data processing system 120 can receive the second request for content 226. The data processing system 120 can execute a second content selection process at ACT 228. The second content selection process can include one or more function or component of the first content selection process. The second content selection process can identify a second plurality of content items 230 and corresponding magnitude values 232. For example, the second plurality of content items can include a third content item having a magnitude of 0.7, and a fourth content item having a magnitude of 0.6. The data processing system 120 can determine, at ACT 234, a second timer value based on the magnitude of the third content item and a baseline magnitude (e.g., the magnitude of one or more of the first content item, second content item and fourth content item, or a combination of the one or more magnitude). The data processing system 120 can determine the second timer value via the timer adjustment component 135.

At ACT 236, the data processing system 120 can provide the third content item 238, which corresponds to the highest magnitude content item in the second plurality of content items 230, for rendering in the content slot 206. The content slot 206 can be the same content slot 206 in which the first content item 220 was previously rendered. The data processing system 120 can provide the second timer value to establish the refresh time for the third content item 230 rendered in the content slot 206. At ACT 240, the computing device 110 can receive the third content item 238 for rendering in the content slot 206 and start the timer with the second timer value. The second timer value can be different from the first timer value.

Figure 3:
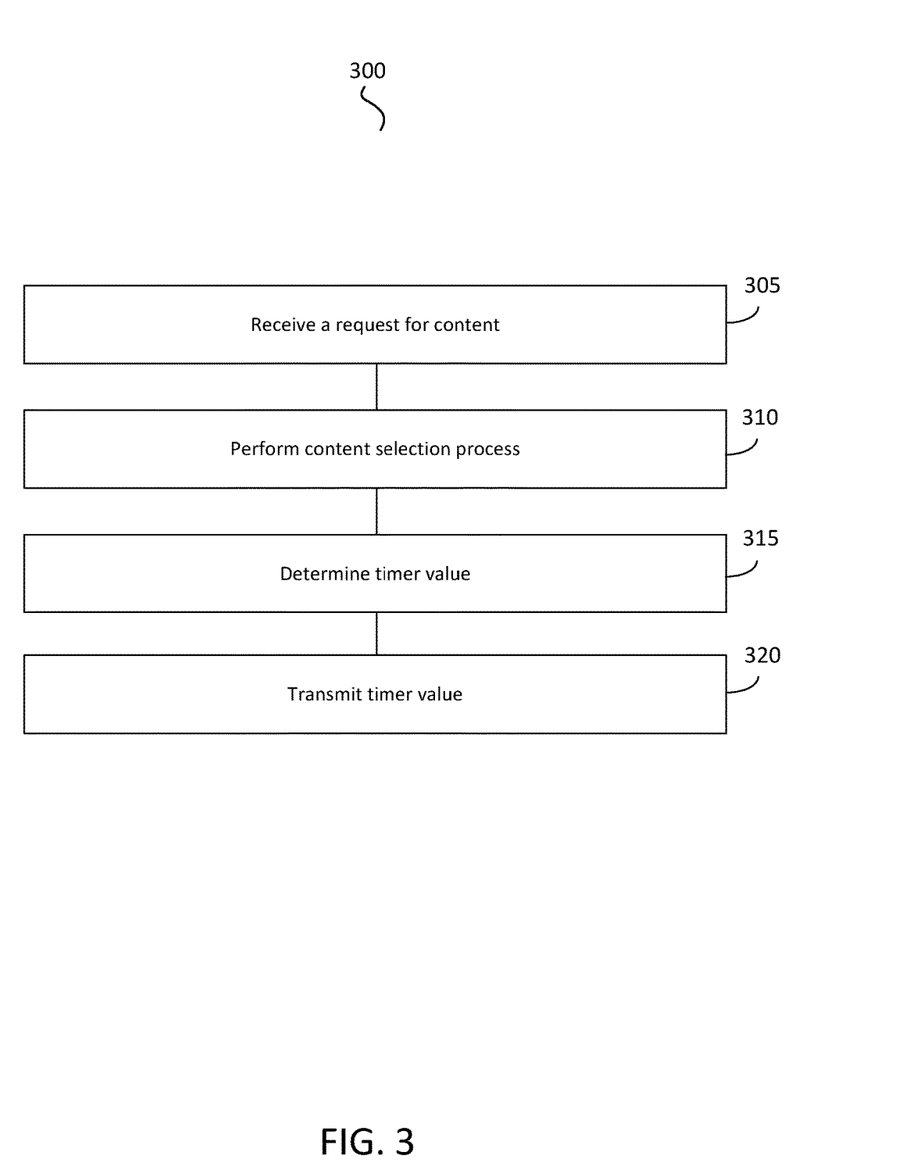
FIG. 3 is an illustration of a method of balancing data requests between a computing device and content selection infrastructure over a computer network.

FIG. 3 is an illustration of a method of balancing data requests between a computing device and content selection infrastructure over a computer network. The method 300 can include a computer-implemented method (or data processing system) of balancing data requests via content selection infrastructure comprising at least one processor in communication with at least one memory. The method 300 can be performed via one or more system or component illustrated in FIG. 1, FIG. 2, or FIG. 4, including, e.g., a data processing system, interface, timer adjustment component, timer component, content selector, data repository, content provider, content publisher, network, or computing device.

At ACT 305, a data processing system can receive a request for content. For example, the data processing system can receive one or more data packets comprising a request for content. The request can be for content that is to be rendered in a content slot presented by electronic display hardware via a resource executed by a computing device. The content slot can be coded with a default timer value input. The default timer value can be used by a timer component to measure elapsed time and refresh the content slot with a new content item upon expiration of the timer. The content slot may not be coded with a default value. Instead, the data processing system can obtain the default timer value from memory of the data processing system. In the event the content slot does not include a default timer value and the data processing system does not provide a default timer value for the content slot, the data processing system can determine the timer value based on content item identified during the real-time content selection process.

At ACT 310, the data processing system can perform or execute a content selection process. For example, the data processing system (e.g., via a content selector component) can execute, responsive to the request, a real-time content selection process to identify a plurality of content items based on the one or more data packets. A first content item of the plurality of content items can have a first magnitude, and a second content item of the plurality of content items can have a second magnitude. The first content item can be ranked higher than the second content item if the first magnitude is greater than the second magnitude.

At ACT 315, the data processing system can determine a timer value. For example, the data processing system can determine a timer value based on a comparison of the first magnitude with the second magnitude. The data processing system can determine the timer value using one or more technique or function. The determined timer value can be different from the default timer value. The determined timer value can be less than or greater than the default timer value.

The data processing system can determine the timer value using a baseline magnitude. The baseline magnitude can be based on historical magnitude values stored in the data processing system or otherwise obtained by the data processing system. The data processing system can determine the timer value based on the magnitude of the highest ranking content item and the baseline magnitude.

The data processing system can determine the timer value based on a logarithm of a ratio of a magnitude of a second highest ranking content item and the magnitude of the highest ranking content item. The data processing system can determine the magnitude by mapping the ratio of the second magnitude and the first magnitude to the timer value in a range of timer values. The mapping may be a one-to-one mapping or the mapping can include a mapping function, such as a monotonically increasing function.

At Act 320, the data processing system can transmit the timer value. For example, the data processing system can transmit the first content item and the timer value to the computing device to set the timer value or override the default timer value. The timer value can be input into a timer component to cause the computing device to replace the first content item rendered in the content slot upon expiration of the timer component.

The data processing system can transmit, responsive to expiration of the timer component, a second (or subsequent) content item to the computing device to cause the computing device to replace the first content item rendered in the content slot with the second content item.

Figure 4:
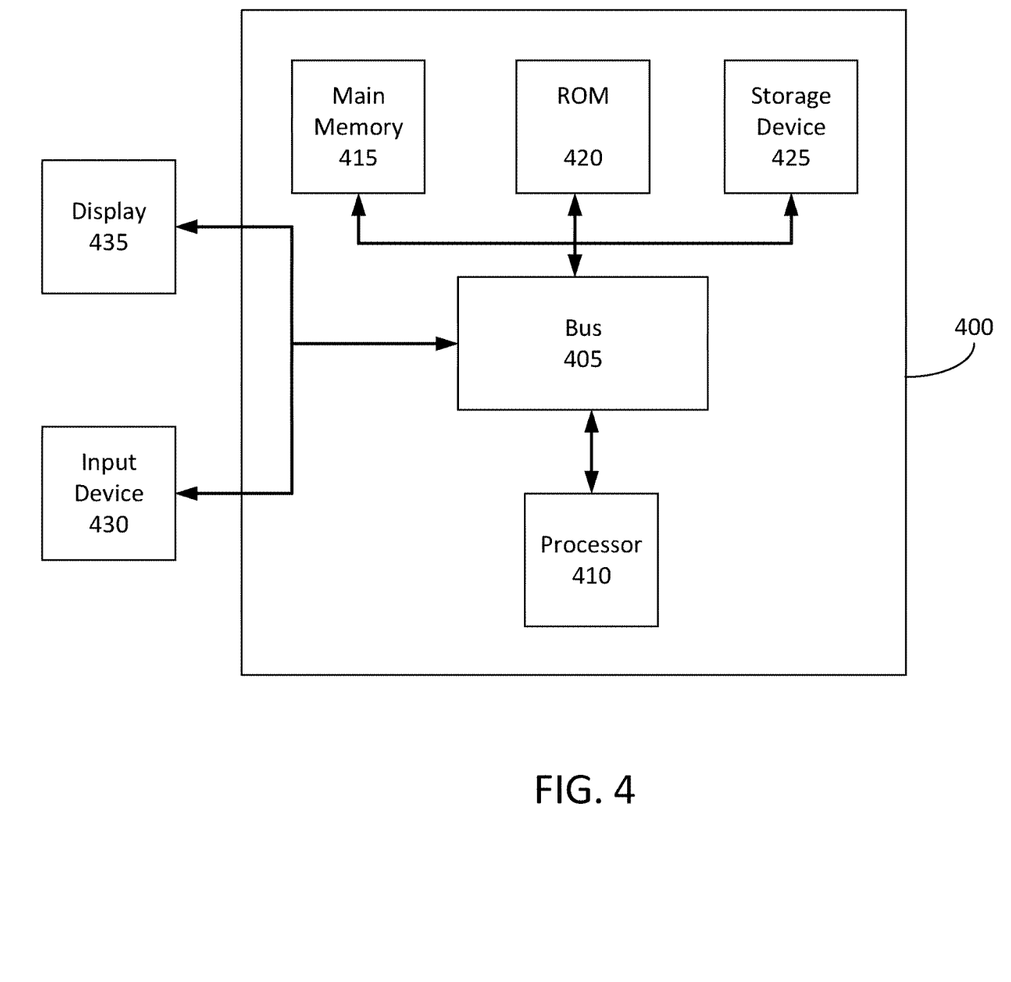
FIG. 4 is a block diagram illustrating an architecture for a computer system that may be employed to implement various elements of the systems shown in FIGS. 1 and 2, and the method shown in FIG. 3.

FIG. 4 is a block diagram of an example computer system 400. The computer system or computing device 400 can include or be used to implement the system 100, or its components such as the data processing system 120. The computing system 400 includes a bus 405 or other communication component for communicating information and a processor 410 or processing circuit coupled to the bus 405 for processing information. The computing system 400 can also include one or more processors 410 or processing circuits coupled to the bus for processing information. The computing system 400 also includes main memory 415, such as a random access memory (RAM) or other dynamic storage device, coupled to the bus 405 for storing information, and instructions to be executed by the processor 410. The main memory 415 can be or include the data repository 145. The main memory 415 can also be used for storing position information, temporary variables, or other intermediate information during execution of instructions by the processor 410. The computing system 400 may further include a read only memory (ROM) 420 or other static storage device coupled to the bus 405 for storing static information and instructions for the processor 410. A storage device 425, such as a solid state device, magnetic disk or optical disk, can be coupled to the bus 405 to persistently store information and instructions. The storage device 425 can include or be part of the data repository 145.

The computing system 400 may be coupled via the bus 405 to a display 435, such as a liquid crystal display, or active matrix display, for displaying information to a user. An input device 430, such as a keyboard including alphanumeric and other keys, may be coupled to the bus 405 for communicating information and command selections to the processor 410. The input device 430 can include a touch screen display 435. The input device 430 can also include a cursor control, such as a mouse, a trackball, or cursor direction keys, for communicating direction information and command selections to the processor 410 and for controlling cursor movement on the display 435. The display 435 can be part of the data processing system 120, the client computing device 150 or other component of FIG. 1, for example.

The processes, systems and methods described herein can be implemented by the computing system 400 in response to the processor 410 executing an arrangement of instructions contained in main memory 415. Such instructions can be read into main memory 415 from another computer-readable medium, such as the storage device 425. Execution of the arrangement of instructions contained in main memory 415 causes the computing system 400 to perform the illustrative processes described herein. One or more processors in a multi-processing arrangement may also be employed to execute the instructions contained in main memory 415. Hard-wired circuitry can be used in place of or in combination with software instructions together with the systems and methods described herein. Systems and methods described herein are not limited to any specific combination of hardware circuitry and software.

Although an example computing system has been described in FIG. 4, the subject matter including the operations described in this specification can be implemented in other types of digital electronic circuitry, or in computer software, firmware, or hardware, including the structures disclosed in this specification and their structural equivalents, or in combinations of one or more of them.

For situations in which the systems discussed herein collect personal information about users, or may make use of personal information, the users may be provided with an opportunity to control whether programs or features that may collect personal information (e.g., information about a user's social network, social actions or activities, a user's preferences, or a user's location), or to control whether or how to receive content from a content server or other data processing system that may be more relevant to the user. In addition, certain data may be anonymized in one or more ways before it is stored or used, so that personally identifiable information is removed when generating parameters. For example, a user's identity may be anonymized so that no personally identifiable information can be determined for the user, or a user's geographic location may be generalized where location information is obtained (such as to a city, postal code, or state level), so that a particular location of a user cannot be determined. Thus, the user may have control over how information is collected about him or her and used by the content server.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The operations described in this specification can be implemented as operations performed by a data processing apparatus on data stored on one or more computer-readable storage devices or received from other sources.

The terms "data processing system" "computing device" "component" or "data processing apparatus" encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. The interface 130, timer adjustment component 135, tuner component 140, content selector component 145 and other data processing system 120 components can include or share one or more data processing apparatuses, systems, computing devices, or processors.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the data processing system 120) to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as system 100 or system 400 can include clients and servers. A client and server are generally remote from each other and typically interact through a communication network (e.g., the network 105). The relationship of client and server arises by virtue of computer programs running on the respective computers and having a client-server relationship to each other. A server can transmit data (e.g., data packets representing a content item) to a client device (e.g., for purposes of displaying data to and receiving user input from a user interacting with the client device). Data generated at the client device (e.g., a result of the user interaction) can be received from the client device at the server (e.g., received by the data processing system 120 from the computing device 110 or the content provider computing device 125 or the content publisher device 115).

While operations are depicted in the drawings in a particular order, such operations are not required to be performed in the particular order shown or in sequential order, and all illustrated operations are not required to be performed. Actions described herein can be performed in a different order.

The separation of various system components does not require separation in all implementations, and the described program components can be included in a single hardware or software product. For example, the gain adjustment component 135, or the content selector component 145, can be a single component, app, or program, or a logic device having one or more processing circuits, or part of one or more servers of the data processing system 120.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A system to balance data requests over a computer network, comprising: a data processing system comprising a timer adjustment component and a content selector component executed by one or more processors, the data processing system configured to: receive one or more data packets comprising a request for content to be rendered in a content slot presented by electronic display hardware via a resource executed by a computing device, the content slot coded with a default timer value input into a timer component to replace the content rendered in the content slot upon expiration of the timer component; execute, responsive to the request, a real-time content selection process to identify a plurality of content items based on the one or more data packets, a first content item of the plurality of content items having a first magnitude based on a relevancy of the first content item, and a second content item of the plurality of content items having a second magnitude based on a relevancy of the second content item, the first content item ranked higher than the second content item by the real-time content selection process; determine a timer value based on a comparison of the first magnitude based on the relevancy of the first content item with the second magnitude based on the relevancy of the second content item, the timer value greater than the default timer value; and transmit the first content item and the timer value to the computing device to override the default timer value, the timer value input into the timer component to cause the computing device to replace the first content item rendered in the content slot upon expiration of the timer component; receive a second request for content to replace the first content item rendered in the content slot, the second request for content transmitted by the computing device responsive to expiration of the timer component; execute, responsive to the second request, a second real-time content selection process to identify a second plurality of content items, a third content item of the second plurality of content items having a third magnitude, and a fourth content item of the second plurality of content items having a fourth magnitude, the third content item ranked higher than the fourth content item by the real-time content selection process; determine a second timer value based on a comparison of the third magnitude with the fourth magnitude, the second timer value different from the default timer value and the timer value; and transmit the third content item and the second timer value to the computing device to override the timer value or the default timer value, the second timer value input into the timer component to cause the computing device to replace the third content item rendered in the content slot upon expiration of the timer component.

2. The system of claim 1, wherein the data processing system is further configured to:
determine a baseline magnitude based on historical magnitude values; and
determine the timer value based on the first magnitude and the baseline magnitude.

3. The system of claim 1, wherein the data processing system is further configured to:
determine the timer value based on a logarithm of a ratio of the second magnitude and the first magnitude.

4. The system of claim 1, wherein the data processing system is further configured to:
map a ratio of the second magnitude and the first magnitude to the timer value in a range of timer values, the range of timer values comprising a minimum timer value and a maximum timer value.

5. The system of claim 1, wherein the data processing system is further configured to:
map, based on a monotonically increasing tuning function, a ratio of the second magnitude and the first magnitude to the timer value.

6. The system of claim 1, wherein the data processing system is further configured to:
receive a third request for content to replace the second content item in memory, the third request for content transmitted by the computing device responsive to expiration of the timer component.

7. The system of claim 1, wherein the data processing system is further configured to:
compare the timer value with the default timer value; and
determine to override the default value with the timer value based on the comparison.

8. A system to balance data requests over a computer network, comprising:
a data processing system comprising a timer adjustment component and a content selector component executed by one or more processors, the data processing system configured to:
receive one or more data packets comprising a request for content to be rendered in a content slot presented by electronic display hardware via a resource executed by a computing device, the content slot coded with a default timer value input into a timer component to replace the content rendered in the content slot upon expiration of the timer component;
execute, responsive to the request, a real-time content selection process to identify a plurality of content items based on the one or more data packets, a first content item of the plurality of content items having a first magnitude, and a second content item of the plurality of content items having a second magnitude, the first content item ranked higher than the second content item by the real-time content selection process;
determine a timer value based on a comparison of the first magnitude with the second magnitude, the timer value greater than the default timer value;
transmit, responsive to the request for content, the first content item, the second content item and the timer value to override the default timer value, the timer value input into the timer component to cause the computing device to replace the first content item rendered in the content slot upon expiration of the timer component, the first content item and the second content item provided to the computing device prior to expiration of the timer component;
instruct the computing device to render the first content item in the content slot and store the second content item in memory; and
instruct the computing device to retrieve the second content item from memory upon expiration of the timer component, and replace the first content item rendered in the content slot with the second content item upon expiration of the timer component.

9. A system to balance data requests over a computer network, comprising: a data processing system comprising a timer adjustment component and a content selector component executed by one or more processors, the data processing system configured to: receive one or more data packets comprising a request for content to be rendered in a content slot presented by electronic display hardware via a resource executed by a computing device, the content slot coded with a default timer value input into a timer component to replace the content rendered in the content slot upon expiration of the timer component; execute, responsive to the request, a real-time content selection process to identify a plurality of content items based on the one or more data packets, a first content item of the plurality of content items having a first magnitude based on a relevancy of the first content item, and a second content item of the plurality of content items having a second magnitude based on a relevancy of the second content item, the first content item ranked higher than the second content item by the real-time content selection process; determine a timer value based on a comparison of the first magnitude based on the relevancy of the first content item with the second magnitude based on the relevancy of the second content item, the timer value greater than the default timer value; and transmit the first content item and the timer value to the computing device to override the default timer value, the timer value input into the timer component to cause the computing device to replace the first content item rendered in the content slot upon expiration of the timer component; receive a second request for content to replace the first content item rendered in the content slot, the second request for content transmitted by the computing device responsive to expiration of the timer component; execute, responsive to the second request, a second real-time content selection process to identify a second plurality of content items, a third content item of the second plurality of content items having a third magnitude, and a fourth content item of the second plurality of content items having a fourth magnitude, the third content item ranked higher than the fourth content item by the real-time content selection process; determine a second timer value based on a comparison of the third magnitude with the fourth magnitude, the second timer value different from the default timer value and the timer value; compare the second timer value with the default timer value to determine the second timer value is less than the default timer value; and determine not to override the default value with the second timer value based on the second timer value less than the default timer value.

10. A method of balancing data requests over a computer network, comprising: receiving, by a data processing system having at least one processor, one or more data packets comprising a request for content for rendering in a content slot presented by electronic display hardware via a resource executed by a computing device, the content slot coded with a default timer value input into a timer component to replace the content rendered in the content slot upon expiration of the timer component; performing, by a content selector component of the data processing system, responsive to the request, a real-time content selection process to identify a plurality of content items based on the one or more data packets, a first content item of the plurality of content items having a first magnitude based on a relevancy of the first content item, and a second content item of the plurality of content items having a second magnitude based on a relevancy of the second content item, the first content item ranked higher than the second content item by the real-time content selection process; determining, by a timer adjustment component of the data processing system, a timer value based on a comparison of the first magnitude based on the relevancy of the first content item with the second magnitude based on the relevancy of the second content item, the timer value greater than the default timer value; transmitting, by the data processing system, the first content item and the timer value to the computing device to override the default timer value, the timer value input into the timer component to cause the computing device to replace the first content item rendered in the content slot upon expiration of the timer component; transmitting, by the data processing system, the first content item and the second content item to the computing device responsive to the request for content, the first content item and the second content item provided to the computing device prior to expiration of the timer component; instructing, by the data processing system, the computing device to render the first content item in the content slot and store the second content item in memory; and instructing, by the data processing system, the computing device to retrieve the second content item from memory upon expiration of the timer component, and replace the first content item rendered in the content slot with the second content item upon expiration of the timer component.

11. The method of claim 10, comprising:
determining, by the data processing system, a baseline magnitude based on historical magnitude values; and
determining, by the data processing system, the timer value based on the first magnitude and the baseline magnitude.

12. The method of claim 10, comprising:
determining, by the data processing system, the timer value based on a logarithm of a ratio of the second magnitude and the first magnitude.

13. The method of claim 10, comprising:
mapping, by the data processing system, a ratio of the second magnitude and the first magnitude to the timer value in a range of timer values, the range of timer values comprising a minimum timer value and a maximum timer value.

14. The method of claim 10, comprising:
receiving, by the data processing system, a third request for content to replace the second content item in memory, the third request for content transmitted by the computing device responsive to expiration of the timer component.

15. The method of claim 10, comprising:
comparing, by the data processing system, the timer value with the default timer value; and
overriding, by the data processing system, the default value with the timer value responsive to the comparison.

16. The method of claim 10, wherein the data processing system is further configured to:
compare the timer value with the default timer value; and
override the default value with the timer value responsive to the comparison.

17. The method of claim 10, wherein the data processing system is further configured to:
determine the timer value based on a logarithm of a ratio of the second magnitude and the first magnitude.

18. The method of claim 10, wherein the data processing system is further configured to:
retrieve a timer value from a plurality of time values, each timer value corresponding to a ratio of the second magnitude and the first magnitude.

19. The method of claim 10, wherein the data processing system is further configured to:
retrieve a timer value from a plurality of time values, each timer value based on a monotonically increasing tuning function of a ratio of the second magnitude and the first magnitude.

20. The method of claim 10, wherein the data processing system is further configured to:
determine a baseline magnitude based on historical magnitude values; and
determine the timer value based on the first magnitude and the baseline magnitude.

* * * * *